United States Patent [19]

Yamamoto

[11] Patent Number: 4,967,266
[45] Date of Patent: Oct. 30, 1990

[54] PHOTOGRAPHIC PRINTER WITH A MONITOR

[75] Inventor: Takashi Yamamoto, Kanagawa, Japan

[73] Assignee: Fuji Photo Film Co., Ltd., Kanagawa, Japan

[21] Appl. No.: 358,053

[22] Filed: May 30, 1989

[30] Foreign Application Priority Data

May 27, 1988 [JP] Japan ................................ 63-129929

[51] Int. Cl.$^5$ .............................................. G03F 3/10
[52] U.S. Cl. ........................................ 358/76; 358/75; 355/38
[58] Field of Search ................. 358/76, 77, 75, 106; 355/38

[56] References Cited

U.S. PATENT DOCUMENTS 4,736,245 4/1988 Seto et al. ............................. 358/76
4,782,390 11/1988 Hayashi et al. ....................... 355/38

FOREIGN PATENT DOCUMENTS 0232542 11/1985 Japan .
0138946 6/1986 Japan .

*Primary Examiner*—Howard W. Britton
*Assistant Examiner*—Kim Yen Vu
*Attorney, Agent, or Firm*—Sughrue, Mion, Zinn, Macpeak & Seas

[57] ABSTRACT

A photographic printer, having a monitor for displaying thereon a simulated image of a picture frame of an original film to be printed, includes a printing optical system for forming an optical image of the picture frame to which a photographic paper is exposed so as to create a latent image thereon. An electronci imaging system has an image receiving surface which receives the optical image and converts it into video signals for displaying a simulated image on a screen of the monitor. The electronic imaging system is so disposed as to offset a center of the image receiving surface from an optical axis of the printing optical system, whereby displaying the simulated image of said optical image on the monitor screen leaves an area on the screen for displaying another image.

4 Claims, 7 Drawing Sheets

PHOTOGRAPHIC PRINTER WITH A MONITOR

BACKGROUND OF THE INVENTION

The present invention relates to a photographic printer equipped with a monitor for monitoring an image to be printed.

To make prints from a photographic film, such as negative film, it is necessary to verify the location of a picture frame of the negative film in a printing station and to inspect the picture frame's color density and/or color balance. For this purpose, a monitor is incorporated into a photographic printer to display an image of a picture frame of a negative film from which a print is made. Because the image covers the whole area of the monitor screen, the monitor screen cannot display any printing data, such as a print size, a printing size or magnification, as well as the image on the screen. To display such data, it was thought that the image should be reduced in size on the monitor screen to provide an area for the data. However, the reduced image is too small to observe visually.

SUMMARY OF THE INVENTION

In view of the foregoing, it is an object of the present invention to provide a photographic printer with a monitor which can display an image of a picture frame of an original film in a size sufficient to visually observe the image together with data within the monitor screen.

The above and other objects of the present invention are achieved by providing a photographic printer with a monitor comprising a printing optical system for forming an optical image of a picture frame of an original film to which a photographic paper is exposed so as to create a latent image thereon, and electronic imaging apparatus having a photoconverting surface. The optical image is projected onto the photoconverting surface of the electronic imaging apparatus to convert the image into video signals which are displayed as a simulated image on a screen of the monitor. The electronic imaging apparatus is so disposed as to locate the center of the photoconverting surface offset from an optical axis of the printing optical system, whereby displaying the simulated image of the optical image on the screen of the monitor leaves an area on the screen for a display of another image.

According to a preferred embodiment of the present invention, the electronic imaging apparatus comprises an optical image forming device for forming an optical image on an image plane, and an image sensor having a photoconverting surface disposed in the image plane. The optical image forming device has an optical axis which is aligned with the optical axis of the printing optical system and intersects the photoconverting surface of the image sensor at a point offset from a center thereof.

According to another preferred embodiment of the present invention, the optical image forming device has an optical axis which is offset from the optical axis of the printing optical system and intersects the photoconverting surface of the image sensor at a center thereof.

The offset arrangement of the electronic imaging apparatus provides an area on the monitor screen for a display of an image other than the simulated image of the picture frame, so that the monitor can display the simulated image together with an image indicating related data. Furthermore, the offset arrangement of the electronic imaging apparatus obviates the need to provide a complicated circuit for inlaying or composing a data image and the simulated image which is generally expensive.

BRIEF DESCRIPTION OF THE DRAWINGS

The invention will be understood from the following description taken in conjunction with a preferred embodiment thereof with reference to the accompanying drawings, wherein the same reference characters denote the same or like parts throughout several drawings, and in which.

DETAILED DESCRIPTION OF THE PREFERRED EMBODIMENT

Figure 1:
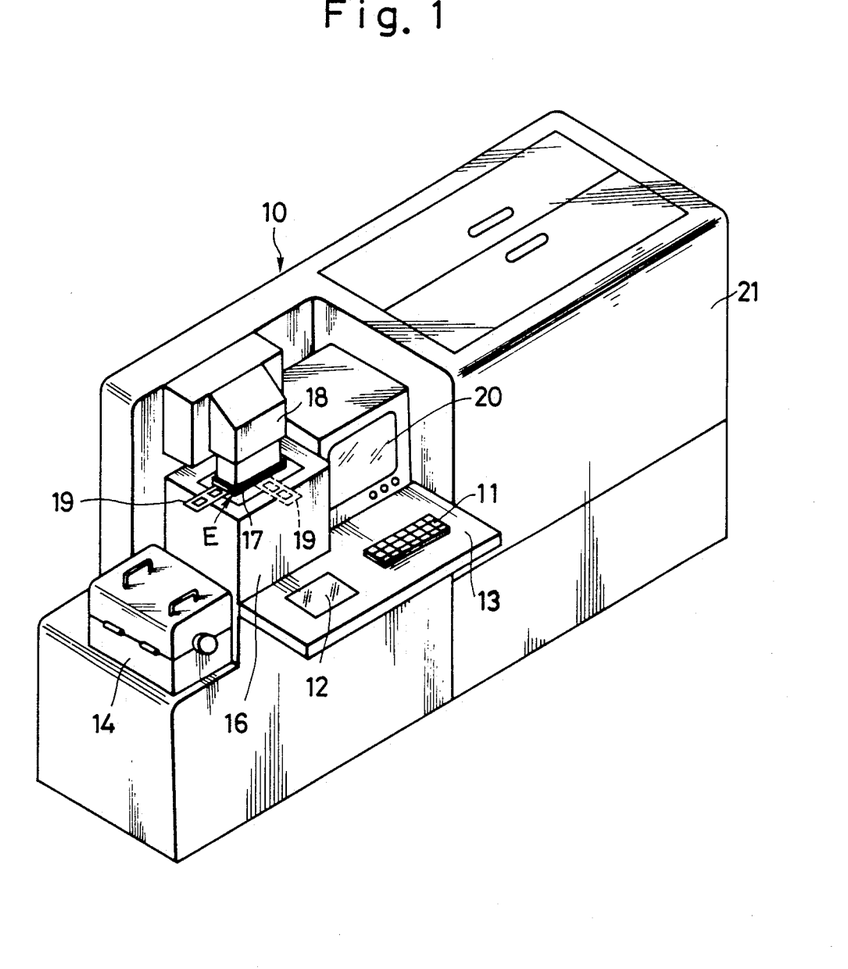
FIG. 1 is a perspective view of a photographic printer-processor with a monitor according to a preferred embodiment of the present invention.

FIG. 1 shows a photographic printer-processor 10 equipped with a monitor 20 in accordance with a preferred embodiment of the present invention. The printer-processor 10 has a front operation table 13 provided with a keyboard 11 for the entry of data relating to exposure and operation, and a lighting box containing a lamp and covered with a screen glass 12 on which a negative film is placed for observation. A box-like paper magazine 14 is mounted on the printer 10 at the left and contains a long web of photographic paper 15 (shown in FIG. 3) in the form of a roll. The photographic paper 15 is withdrawn from the magazine 14 and sent to an exposure section 16 at a rate of one frame per print. A lamp housing 18 containing a lamp is provided above the printing section 16 with a space between the printing section 16 forming an exposure station E. A film carrier 17, which holds and keeps flat a photographic film 19, such as a negative film, is removably inserted into the exposure station E. Printing light emanating from the lamp in the lamp housing 18 illuminates the negative film 19 through a light regulation filter unit including at least blue, green and red filters (not shown but well known in the art) to print an image on the photographic paper 15. The image of the negative film 19 thus illuminated is, on the other hand, picked up by an imaging device to be displayed in a positive form on a color monitor 20, such as a color CRT, for visual observation or inspection.

Prior to printing the negative film 19 is put on the screen glass 12 of the lighting box for visual observation of the frames to be printed. Thereafter, the negative carrier 17, that holds the negative film 19 sideways if a longitudinal print format (which is long from side to side) is required, as shown by a solid line in FIG. 1, or lengthwise if a vertical print format (which is long from top end to bottom end) is required, as shown by a dotted line in FIG. 1, is inserted into the exposure station E. An image of a picture frame of the negative film 19 at the exposure station E is displayed on the color monitor 20 and visually observed or inspected. If color balance and/or density correction is needed to provide a desirable print, necessary correction data is entered through correction keys of the keyboard 11. If the correction data is entered, at least one of the blue, green or red filters of the light regulation filter unit is inserted into a printing path so as to regulate the amount and the quality of printing light. As a result the color monitor 20 displays thereon a positive color image simulated in color balance and color density. If it is required to partly enlarge the image of the picture frame at the exposure station E. the negative film 19 is moved back or forth, or left or right so as to position the part of the image to be enlarged in a frame defined by lines 80a, 80b, 81a and 81b (see FIG. 7) for trimming.

After conforming the simulated image in quality and position, a print key of the keyboard 11 is operated to perform an exposure of the photographic paper 15. The exposed photographic paper is developed in a processing section 21 in a well known manner.

Figure 2:
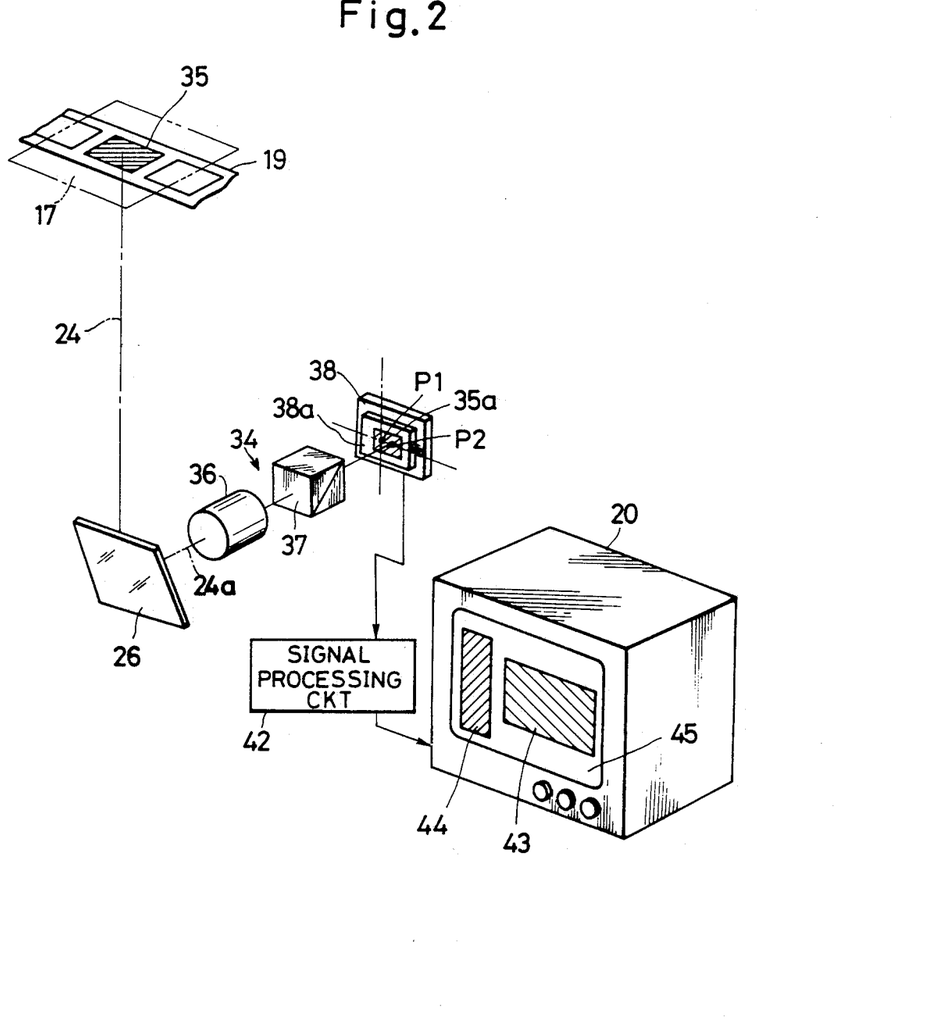
FIG. 2 is an explanatory perspective illustration showing an optical arrangement of an electronic imaging apparatus of the photographic printer-processor shown in FIG. 1.
Figure 3:
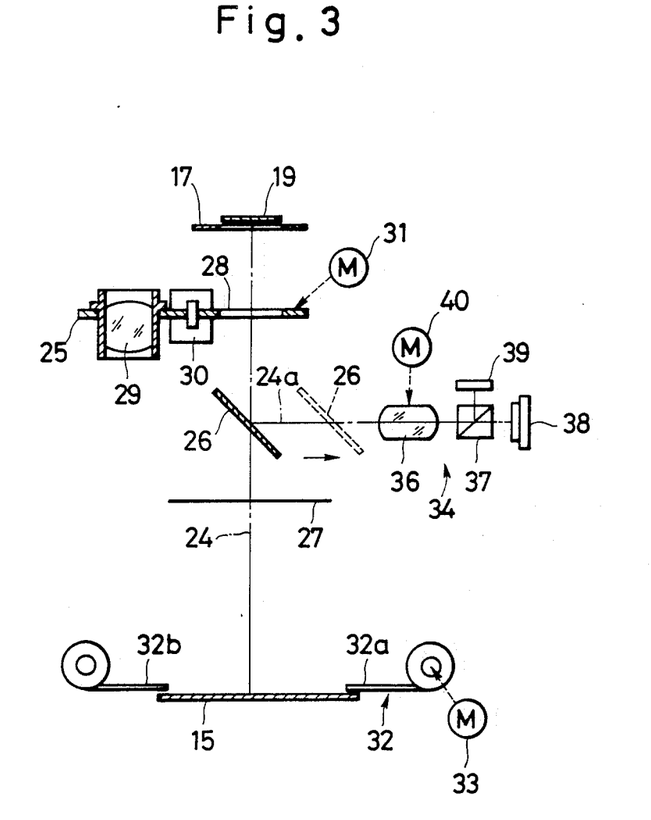
FIG. 3 is an explanatory illustration showing the overall optical arrangement incorporated in the photographic printer-processor shown in FIG. 1.

A printing optical system and an imaging system incorporated in the printer 10 are shown in FIGS. 2 and 3. Between the negative film 19 and the photographic paper 15 are disposed a turret disk 25, a reflective mirror 26 movable in a direction perpendicular to the printing optical path 24, and a shutter 27 arranged in order from the top. The turret disk 25 may have mounted thereon, for example two printing lenses 29 and 30 having different focal lengths. The disk 25 is formed with an opening 28 through which the printing light passes. This turret disk 25 is rotated stepwise by a motor 31 to locate one of the two printing lenses 29 and 30 and the opening 28 in the printing light path 24.

A variable framing mask 32 is disposed above and close to the path of the photographic paper 15 and has its opening changed so as to define a desired size of printing area. This variable framing mask 32 consists of a pair of light opaque sheets 32a and 32b, disposed on both sides of the photographic paper 15, which are withdrawn from or wound around rolls in opposite directions by a motor 33 to vary the size of printing area.

The mirror 26 is shiftable between an in-use position where it reflects the printing light at a right angle toward the imaging system disposed opposite to the front operation table 13 in the printer 10, and a no-use position which allows the printing light to travel directly to the photographic paper 15. Upon monitoring a simulated image on the color monitor 20 the turret disk 25 is turned to align the opening 28 with the printing path 24 and the movable mirror 26 is brought into the in-use position to intersect the printing light path 24 at a 45 degree angle. On the other hand, upon printing, the turret disk 25 is turned to bring one of the printing lenses 29 and 30 into alignment with the printing light path 24 and, simultaneously, the mirror 26 is displaced out of the printing light path and placed in the no-use position so as not to interrupt the printing light.

The printing light reflected by the mirror 26 travels toward the imaging device 34 along a light path 24a. A zoom lens 36, whose optical path is aligned with the light path 24a, focuses the light onto a color imaging device such as a color image sensor 38 through a beam splitter 37, forming an image on the color imaging sensor 38. The zoom lens 36 is driven by a motor 40 to adjust its focal length according to the size of a picture frame 35 of the negative film 19 so as always to display the same size of simulated image on the color monitor 20 independent of the frame size. The light from the zoom lens 36 is partially reflected upwardly by the beam splitter 37 toward a photometric element 39.

The color image sensor 38, which can take any well known image sensor, such as a MOS type or a CCD type image sensor, is so located that an effective imaging surface 38a of the image sensor 38 has its center P1 offset from a point P2 at which the light path 24a intersects the effective imaging surface 38a. This offset location of the optical path 24a enables the zoom lens 36 to have an image area 35a (which is shaded in FIG. 2) on the effective imaging surface 38a of the image sensor 38 having the center P2 offset from the center P1 of the effective imaging surface 38a of the image sensor 38.

Video signals output from the color image sensor are sent to an image processing circuit 42 for simulating an image according to the characteristics of the photographic paper 15. The video signals processed in the image processing circuit 42 further are sent to the color monitor 20 and displayed as a simulated image 43 and another image 44 on a screen 45 of the color monitor 20.

Figure 4:
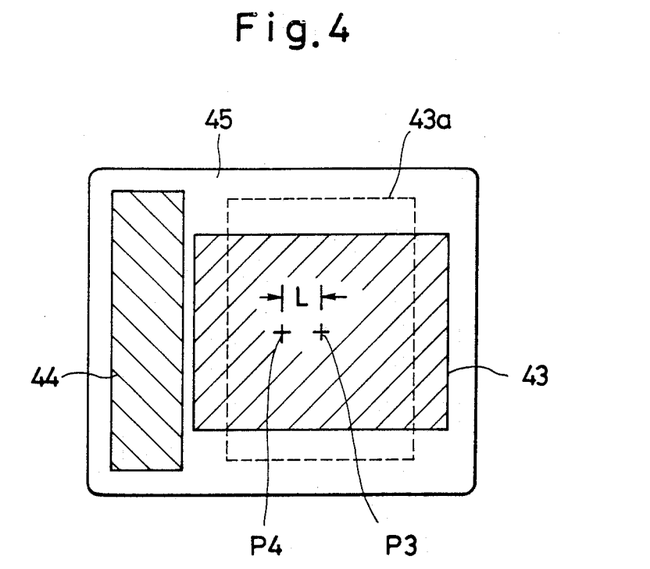
FIG. 4 is a schematic illustration of a monitor screen of the photographic printer-processor shown in FIG. 1.
Figure 5:
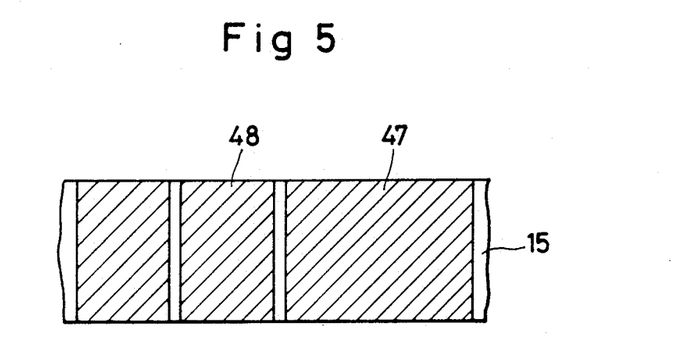
FIG. 5 is a schematic illustration showing part of a photographic paper on which images are printed.

FIG. 4 shows a display of the screen 45 of the color monitor 20. When making a longitudinal print format, the film 19 is placed sideways in the exposure station E such that the lengthwise direction of the picture frame 35 is oriented in a direction in which the photographic paper is transported so as to display a simulated image of the picture frame 35 as shown by a shaded area 43. In making such a longitudinal print format, an image 47 is printed on the photographic paper 15 as shown in FIG. 5. For example, when using a photographic paper having a width of 127 mm, a so-called 2L size (127 × 177.8 mm) of print is obtained.

When making a vertical print format the film 19 is placed lengthwise in the exposure station E in such a way that the lengthwise direction of the picture frame 35 is oriented in a direction perpendicular to the direction in which the photographic paper is transported, so as to display a simulated image of the picture frame 35 as shown by an area 43a defined by a dotted line in FIG. 4. In making such a vertical print format, an image 48 is printed on the photographic paper 15, as shown in FIG. 5. For example, when using a photographic paper having a width of 127 mm, a so-called L size (80 × 127 mm) of print is obtained An effective image display area on the screen 45 necessary for display of either one of the longitudinal or vertical formats of images, is square in area. Because, as was previously noted, the color image sensor 38 is located so that the center P1 of the effective imaging surface 38a of the color image sensor 38 is offset from the center P2 of the image area 35a of the imaging device 34, the center P3 of the effective square image display area on the screen 45 is offset by a distance L from the center P4 of the screen 45. Owing to the offset location of the effective square image display area, the screen 45 provides a vertical format of image display area 44 in which data such as a location, a print size, a printing size or magnification can be displayed.

Figure 6:
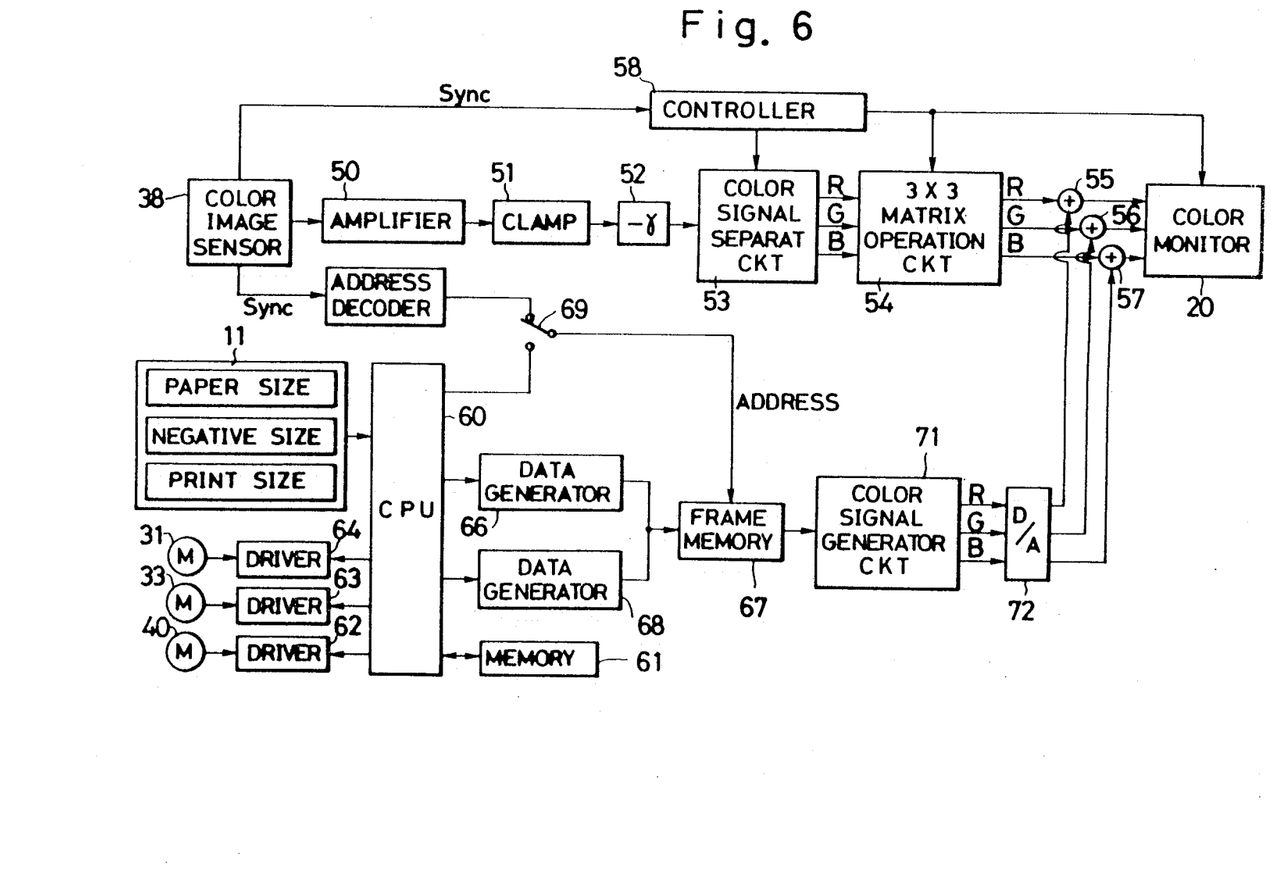
FIG. 6 is a block diagram showing a control circuit incorporated into the photographic printer-processor shown in FIG. 1.

The photographic printer described above is operated by means of a control circuit shown in FIG. 6. A video signal output from the color image sensor 38 is amplified by an amplifier 50. A clamp circuit 51 sets a reference potential for the amplified video signal. The amplified video signal from the clamp circuit 51 is sent to a minus gamma ($-\gamma$) circuit 52 wherein the video signal is subjected to a gamma correction and a negative-to-positive inversion. The corrected video signal is separated into three color video signals, namely red, green, and blue video signals, by a color signal separation circuit 53. After having been subjected to an electric masking processing in a 3×3 matrix operation circuit 54, the three color video signals are sent to the color monitor 20 through adding circuits 55-57 provided for each of the respective colors. A controller 58 controls the operation of the color signal separation circuits 53 and the 3×3 matrix operation circuit 54 with synchronizing signals for the color image sensor 38.

Through the keyboard 11, data such as the size of the photographic paper 15 loaded in the printer the size of the negative film 19, the size of print and other necessary information are input to a CPU 60. A memory 61 stores data necessary to control the sequence of the printing operation and to calculate a proper exposure, data representing the relationship between sizes of negative films and the focal lengths of the zoom lens 37, data representing the relationship between print sizes and masking sizes of variable framing mask 32, and data representing the relationship among the negative film sizes, the print sizes and the printing lenses 29 and 30. When data of the size of the negative film 19 from which prints are desired are input to the CPU 60 through the keyboard 11, the CPU 60 reads out the focal length data of the zoom lens 36 from the memory 61 and causes the driver 62 to drive the motor 40 according to the data read out, enlarging a simulated image displayed on the screen 45 of the color monitor 20 to a predetermined size. The CPU 60 also causes a driver 63 to drive the motor 33, adjusting the variable framing mask 32 to a desired print size and a driver 64 to drive the motor 31, inserting one of the printing lenses 29 and 30 according to a printing size or magnification that is a ratio of the desired print size relative to the negative film size.

The CPU 60 calculates a location of image display area on the screen 45 of the color monitor 20 in which the simulated image should be displayed, and sends a signal relating the location of image display area to a data generator 66 which generates data of the location of image display area. The data generator 66 stores the data representing two vertical and two horizontal frame lines defining an image display area in a frame memory 67. The CPU 60 further sends data relating to the desired print size and the printing size to a data generator 68, and the data generator 68 stores data of characters or letters in the frame memory 67 connected to the CPU 60 through a selector switch 69.

Upon the reading out of data, the frame memory 67 is connected to an address decoder 70 by the selector switch 69 so as to read out the character data according to address signals from the address decoder 70. The address decoder 70 generates the address signals according to the synchronizing signals for the color image sensor 38.

The data of the frame lines and the characters are read out from the frame memory 67 simultaneously with the reading out of video signals from the color image sensor 38. The data are converted into three color image data, namely red, green, and blue, by a color signal generator circuit 71. The three color image data, which have the same value in order to display the frame lines and the characters in gray, are converted into analog form by a D/A converter 72 and sent to the adding circuits 55-57, so as to be added together by color to three color video signals of a simulated image. Finally, the added color signals are displayed as a composed image on the screen 45 of the color monitor 20 as shown in FIG. 7 and 8.

Figure 7:
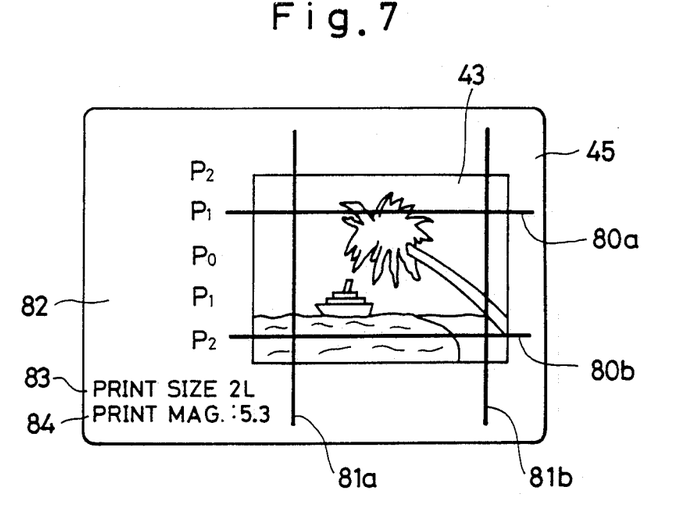
FIGS. 7 and 8 are illustrations of the monitor screen on which images are displayed.
Figure 8:
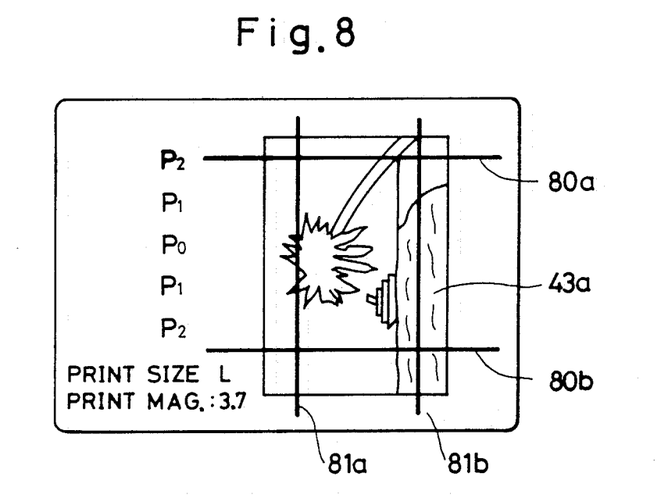

FIG. 7 shows the screen 45 displaying an image of a 35 mm size picture frame when a longitudinal format of print is made. Part of a simulated image of a 35 mm size picture frame enclosed by frame lines 80a, 80b, 81a and 81b is printed on the photographic paper 15. When changing the size of the variable framing mask 32 or the printing size for trimming the framing lines 80a-81b are shifted in a parallel manner so as to increase or decrease the image display area. Location marks 82, the desired print size 83, and the printing size 84 are displayed in the vertical image display area 44. FIG. 8 shows the screen 45 displaying an image of a 35 mm size picture frame when a vertical format of print is made.

Figure 9:
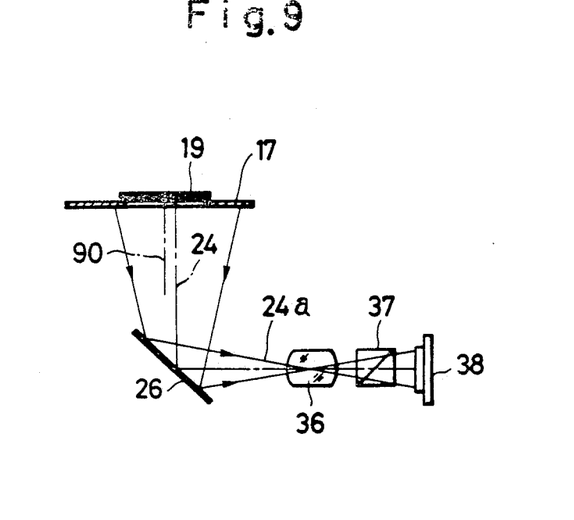
FIG. 9 is an explanatory illustration, similar to FIG. 2, showing a variant of an optical arrangement of the electronic imaging apparatus of the photographic printer-processor shown in FIG. 1.

As shown in FIG. 9, the zooming lens 36 of the imaging device 34 and the color image sensor 38 may be arranged axially from a line 90 passing through the center of the exposure station E or the film carrier 17. In FIG. 9, the light path 24a of the imaging device 34 is turned 90 degrees about the printing light path 24 for illustrative purposes only.

Figure 10:
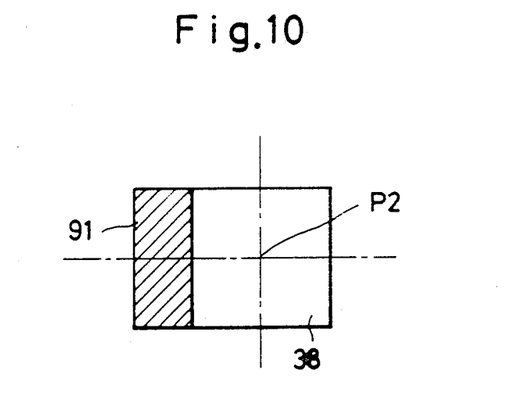
FIG. 10 is a plan view of a color image sensor provided with a mask.

Part of the effective imaging surface 38a of the color image sensor 38 which is not used to receive an optical image may be hidden by a mask 91, as denoted by the shaded portion in FIG. 10. Before displaying a simulated image, various messages indicating operations for the printer and/or input data on the screen 45 of the color monitor 20 may be displayed.

While the invention has been described above in detail with reference to a preferred embodiment, various modifications within the scope and spirit of the invention will be apparent to those of working skill in this technical field. Thus, the invention should be considered as limited only by the scope of the appended claims.

What is claimed is:

1. A photographic printer including a monitor for displaying a simulated image of a picture frame of an original film to be printed, said printer comprising:
    a printing optical system for forming an optical image of said picture frame to which a photographic paper is exposed so as to create a latent image thereon; and
    electronic imaging means, having an image receiving surface for receiving said optical image and converting said optical image into video signals which are displayed as a simulated image on a screen of said monitor said image receiving surface being so disposed as to have a center that is offset from an optical axis of said printing optical system, whereby displaying said simulated image of said optical image on said screen of said monitor leaves an area on said screen for displaying another image.

2. A photographic printer as defined in claim 1, wherein said electronic imaging means comprises optical image forming means for forming an optical image on an image plane and an image sensor having a photoconverting surface disposed in said image plane.

3. A photographic printer as defined in claim 2, wherein said optical image forming means has an optical axis which is aligned with said optical axis of said printing optical axis and intersects said photoconverting surface of said image sensor at a point offset from a center thereof.

4. A photographic printer as claimed in claim 2, wherein said optical image forming means has an optical axis which is offset from said optical axis of said printing optical axis and intersects said photoconverting surface of said image sensor at a center thereof.

* * * * *